(12) United States Patent
Ahn

(10) Patent No.: US 7,161,984 B2
(45) Date of Patent: Jan. 9, 2007

(54) VIDEO REPRODUCTION APPARATUS WITH FAST POST-PROCESSING AND METHOD THEREOF

(75) Inventor: Jong-hak Ahn, Anyang-si (KR)

(73) Assignee: Samsung Electronics Co., Ltd., KyungkiOdo (KR)

( * ) Notice: Subject to any disclaimer, the term of this patent is extended or adjusted under 35 U.S.C. 154(b) by 798 days.

(21) Appl. No.: 10/293,774

(22) Filed: Nov. 14, 2002

(65) Prior Publication Data

US 2003/0138049 A1    Jul. 24, 2003

(30) Foreign Application Priority Data

Jan. 23, 2002    (KR) ................. 2002-3867

(51) Int. Cl.
*H04B 1/66* (2006.01)
(52) U.S. Cl. .................................. 375/240.2
(58) Field of Classification Search ........... 375/240.29, 375/240.2; 348/425.2; 382/275, 239; H04B 1/66
See application file for complete search history.

(56) References Cited

U.S. PATENT DOCUMENTS

| 5,937,101 A * | 8/1999 | Jeon et al. ................. 382/268 |
| 6,862,372 B1 * | 3/2005 | Yang et al. ................. 382/254 |
| 6,983,079 B1 * | 1/2006 | Kim ........................... 382/275 |
| 2002/0146072 A1 * | 10/2002 | Sun et al. ............... 375/240.16 |
| 2003/0035586 A1 * | 2/2003 | Chou et al. ................. 382/233 |
| 2003/0053711 A1 * | 3/2003 | Kim ........................... 382/268 |
| 2003/0152146 A1 * | 8/2003 | Lin et al. ............... 375/240.16 |

FOREIGN PATENT DOCUMENTS

JP    2001-224031 A    8/2001

OTHER PUBLICATIONS

Machine English translation of JP 2001-224031 cited in the IDS of Feb. 10, 2005.*

* cited by examiner

*Primary Examiner*—Tung Vo
(74) *Attorney, Agent, or Firm*—Sughrue Mion, PLLC

(57) ABSTRACT

Provided are a video reproduction apparatus and method capable of effectively post-processing a video signal using a motion vector, a post-processed video signal and a difference video signal. The method includes the steps of (a) variable length decoding the compressed video signal to detect quantized discrete cosine transform (DCT) coefficients and a motion vector, when the compressed video signal is input as a bit stream; (b) inversely quantizing the quantized DCT coefficients detected in (a); (c) performing an inverse DCT (IDCT) on the DCT coefficients obtained in (a) to detect a difference video signal; and (d) selectively performing post-processing on the decoded video signal, based on the motion vector detected in (a) and the characteristics of the difference video signal detected in (c).

6 Claims, 3 Drawing Sheets

US 7,161,984 B2

VIDEO REPRODUCTION APPARATUS WITH FAST POST-PROCESSING AND METHOD THEREOF

BACKGROUND OF THE INVENTION

1. Field of the Invention

The present invention relates to an apparatus and method for processing video data, and more particularly, to an apparatus and method for reproducing video data capable of effectively post-processing video data, using a motion vector and a difference video signal. The present application is based on Korean Patent Application No. 2002-3867, which is incorporated herein by reference.

2. Description of the Related Art

In general, a video reproduction apparatus carries out a decoding process of decoding a compressed video signal which is input as a bit stream, and a post-processing process in which a video signal is filtered to remove edge noise, blocking artifacts, and ringing artifacts therefrom, thereby improving the quality of a decoded video signal. The decoding process and the post-processing process are separately performed.

FIG. 1 is a block diagram of a conventional video reproduction apparatus. The conventional video reproduction apparatus receives a video signal output from a video encoder (not shown), and the video encoder compresses the received video signal. To compress the video signal, the video signal undergoes a discrete cosine transform (DCT) process and is then quantized. The quantized video signal undergoes a motion vector estimation and a variable-length coding (VLC) process, and then is converted into a bit stream format.

Referring to FIG. 1, a variable length decoding (VLD) unit 110 detects a quantized DCT coefficient and a motion vector obtained through a VLD process.

An inverse quantizer 120 inversely quantizes the quantized DCT coefficient and the motion vector, which are obtained by the VLD unit 110, and produces DCT coefficients.

An inverse DCT (IDCT) unit 130 performs an IDCT on the DCT coefficient produced by the inverse quantizer 120 to convert the DCT coefficient into a difference video signal. The difference video signal is produced during an inter frame encoding process. The inter frame encoding process encodes a difference video signal and a motion vector between a previous frame. Also, the intra frame encoding process encodes video signals for one frame.

An adder 140 adds the difference video signal produced by the IDCT unit 130 and a video signal produced by a motion compensating unit 160.

A motion compensating unit 160 compensates for the motion of a video signal based on information on the motion vector produced by the VLD unit 110 and the decoded video signal.

A post-processing unit 150 post-processes the decoded video signal using a filter and the like, to improve the quality of the decoded video signal.

In conclusion, the conventional video reproduction apparatus shown in FIG. 1 post-processes the video signal, which was decoded via the VLD unit 110, the inverse quantizer 120, the IDCT unit 130, and the adder 140, using the post-processing unit 150, and outputs the post-processed video signal to a display unit (not shown). The post-processing unit 150 of the conventional video reproduction apparatus of FIG. 1, however, requires a large amount of calculation to display a moving image in real time, thereby overloading the video reproduction apparatus.

SUMMARY OF THE INVENTION

To solve the above and related problem, it is a first object of the present invention to provide a video reproduction apparatus and method capable of selectively post-processing a desired area of a video signal, using a motion vector, a discrete cosine transform (DCT) coefficient for a difference video signal, and a post-processed video signal.

It is a second object of the present invention to provide a video reproduction apparatus for reproducing a video signal compressed using a DCT and a variable length decoding (VLD) process.

To achieve the first object, there is provided a method of reproducing a compressed video signal, the method including (a) variable length decoding the compressed video signal to detect quantized discrete cosine transform (DCT) coefficients and a motion vector, when the compressed video signal is input as a bit stream; (b) inversely quantizing the quantized DCT coefficients detected in (a); (c) performing an inverse DCT (IDCT) on the DCT coefficients obtained in (a) to detect a difference video signal; and (d) selectively performing post-processing on the decoded video signal, based on the motion vector detected in (a) and the characteristics of the difference video signal detected in (c).

To achieve the second object, there is provided a video reproduction apparatus for reproducing a video signal compressed by a DCT and variable length encoding, the apparatus including a video decoder for performing a variable length decoding process and an IDCT on a compressed video signal, which is input as a bit stream in order, to detect a motion vector and a difference video signal, and compensating for the motion of the input video signal using the motion vector; and a post-processor for selectively post-processing the input video signal based on the motion vector and the characteristics of the difference video signal produced by the video decoder.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
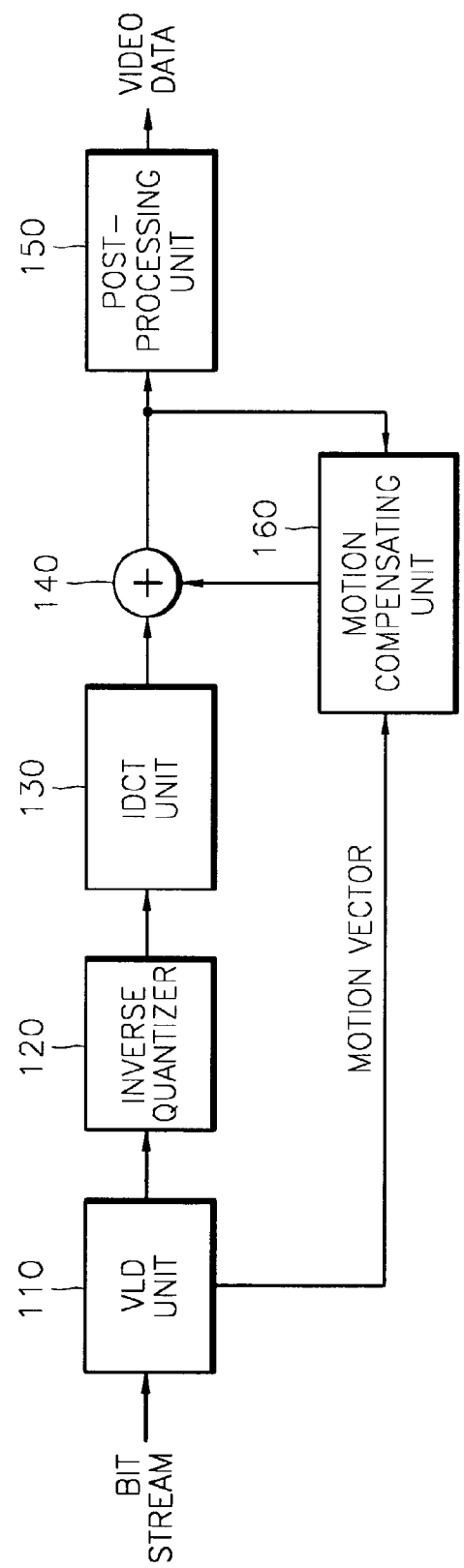
FIG. 1 is a block diagram of a conventional video reproduction apparatus.
Figure 2:
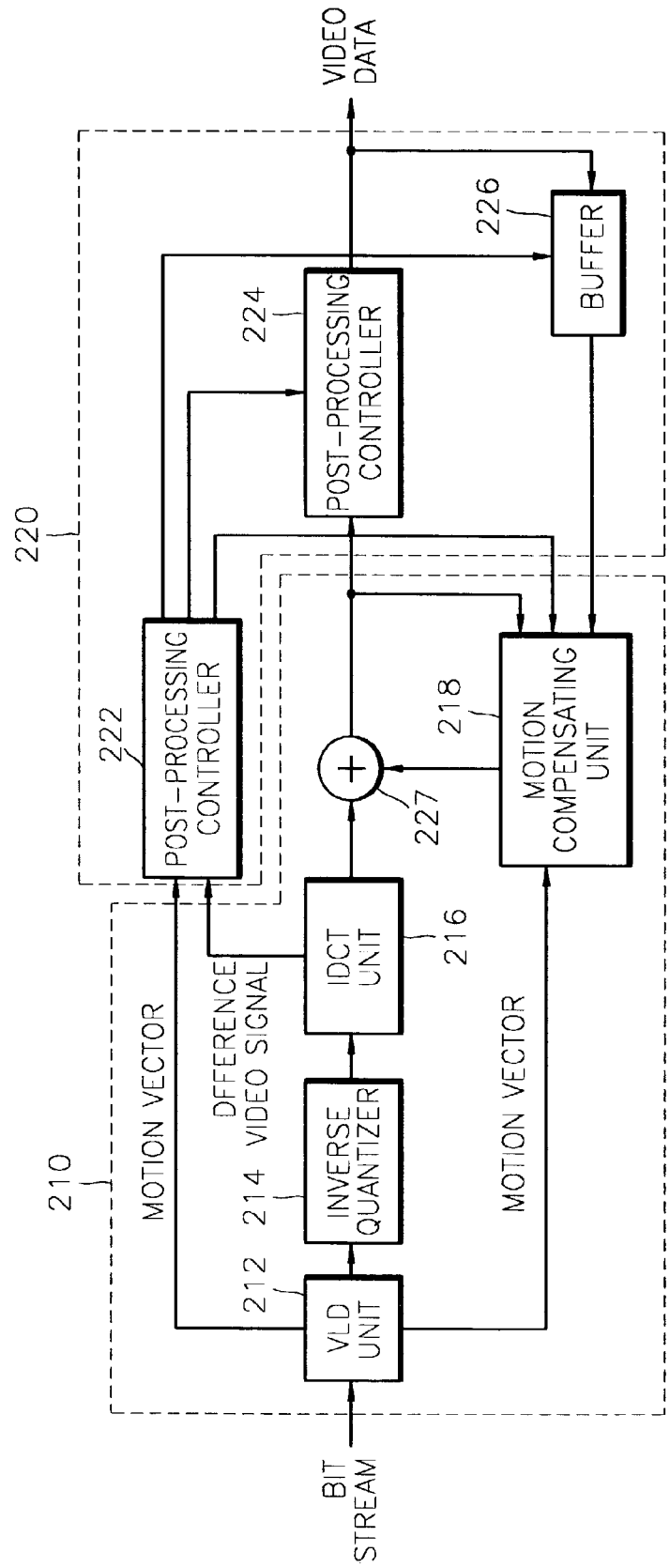
FIG. 2 is a block diagram of a video reproduction apparatus according to the present invention.

FIG. 2 is a block diagram of a video reproduction apparatus according to the present invention. The video reproduction apparatus of FIG. 2 includes a decoder 210 for decoding a compressed video signal which is input as a bit stream, and a post-processor 220 for selectively post-processing the decoded video signal. The decoder 210 uses a video signal that is post-processed by the post-processor 220. Specifically, the decoder 210 includes a variable length decoding (VLD) unit 212, an inverse quantizer 214, an inverse discrete cosine transform (IDCT) unit 216, and a motion compensating unit 218. The post-processor 220 includes a post-processing controller 222, a post-processing unit 224, and a buffer 226.

Hereinafter, each block of a video reproduction apparatus according to the present invention will be described in detail with reference to FIG. 2.

First, a compressed video signal is input as a bit stream to the video reproduction apparatus according to the present invention.

The VLD unit 212 decodes the compressed video signal in order to detect a quantized DCT coefficient and a motion vector.

The inverse quantizer 214 inversely quantizes the quantized DCT coefficient produced by the VLD unit 212.

The IDCT unit 216 performs an IDCT on the DCT coefficient produced by the inverse quantizer 214 in order to detect a difference video signal used by the decoder 210 and the post-processor 220.

An adder 227 adds a video signal whose motion is compensated for and that is estimated by the motion compensating unit 218 to the IDCT video signal obtained by the IDCT unit 216 so as to produce a decoded video signal.

The post-processing controller 222 applies a control signal to the post-processing unit 224, the buffer 226, and the motion compensating unit 218 based on information regarding the motion vector generated by the VLD unit 212 and the characteristics of the difference video signal produced by the IDCT unit 216, and selectively post-processes the video signal. During the post-processing of the video signal, a decoded video signal is post-processed in the case of an intra frame, whereas a decoded video signal is post-processed according to a motion vector if the sum of DCT coefficients of a difference video signal is smaller than a critical value, in the case of an inter frame. That is, in the case of the inter frame, a video signal is not post-processed if there is no motion vector, but only a border portion of a block is post-processed if there is a motion vector. Also, when the sum of the DCT coefficients is larger than the critical value, the sum of the AC components of the DCT coefficients is calculated. However, a video signal is not post-processed according to a motion vector or only a border portion of a block is post-processed if the sum of the AC components is smaller than the critical value, whereas a decoded video signal is post-processed if the sum of the AC components is larger than the critical value.

The motion compensating unit 218 compensates for the motion of the video signal using a control signal generated by the post-processing controller 222, based on information on the motion vector detected by the VLD unit 212 and the video signal that is selectively output from the adder 227 and the buffer 226. More specifically, the control signal, which needs not to be post-processed, is transmitted to the motion compensating unit 218, the motion compensating unit 218 compensates for the motion of the video signal using a post-processed video signal. If the motion compensating unit 218 receives a control signal that needs to be post-processed, the motion compensating unit 218 estimates the motion of the video signal using a video signal that is not post-processed.

The post-processing unit 224 by-passes or post-processes the decoded video signal in response to the control signal generated by the post-processing controller 222.

The buffer 226 temporarily stores the video signal, which is post-processed by the post-processing unit 224, or outputs the video signal to the motion compensating unit 218 to reuse the post-processed video signal, in response to the control signal generated by the post-processing controller 224.

Figure 3:
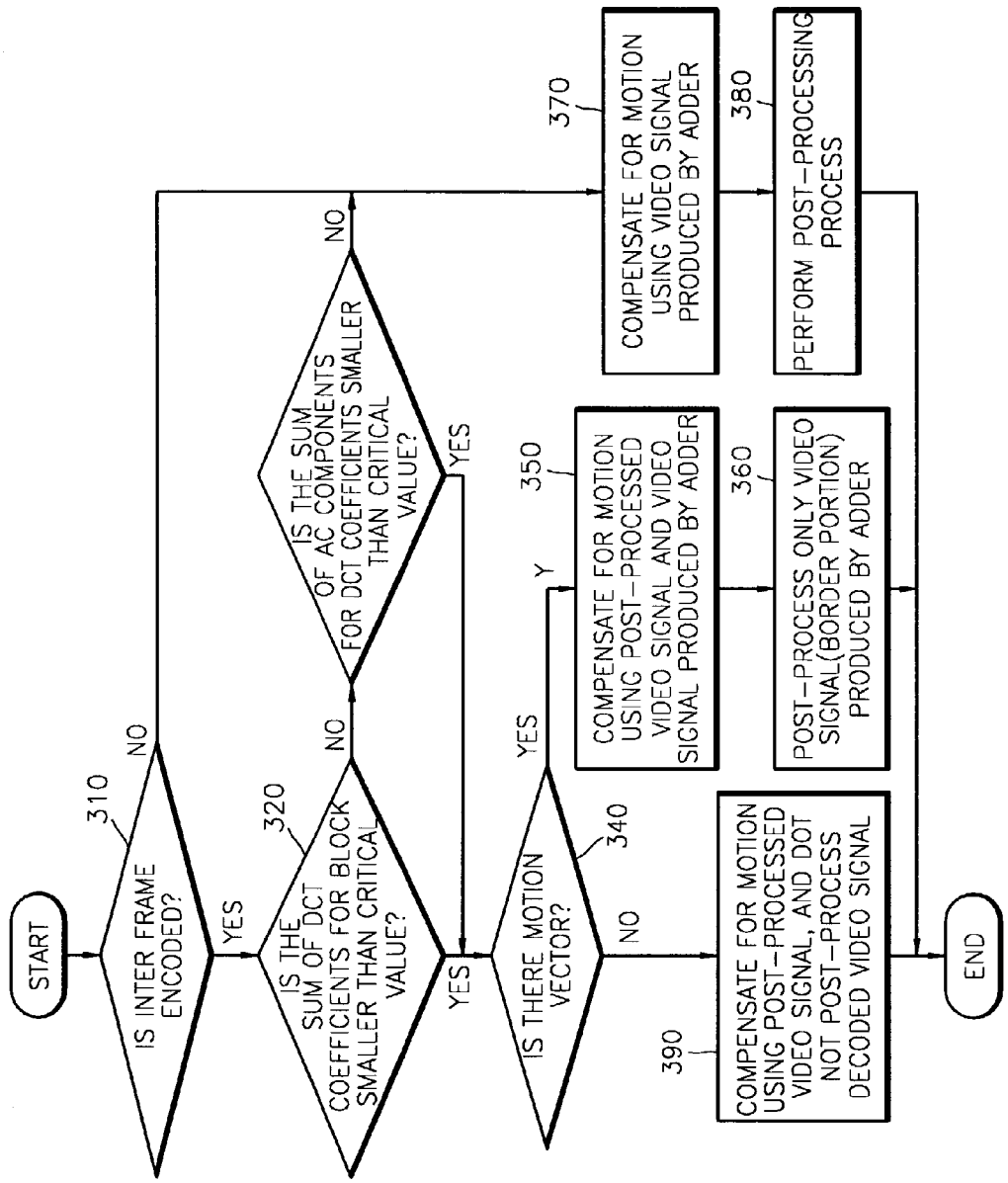
FIG. 3 is a flowchart illustrating a method of reproducing a video image with a post-processing controller shown in FIG. 2.

FIG. 3 is a flowchart illustrating a video reproduction method using the post-processing controller 222 of FIG. 2, according to the present invention. Referring to FIG. 3, first, whether an inter frame is encoded is checked in step 310. If a video signal is a compressed inter frame, information regarding DCT coefficients is received and the sum of DCT coefficients is calculated on a block-by-block basis.

If it is found in step 320 that the calculated sum of DCT coefficients is smaller than a critical value, the presence of a motion vector is checked in step 340. The presence of a motion vector is checked by comparing the motion vector with the critical value. If it is determined in step 320 that the sum of DCT coefficients is larger than the critical value, the sum of AC components of the DCT coefficients is compared with the critical value in step 330. If it is determined in step 330 that the sum of the AC components is smaller than the critical value, it means all of the DCT coefficients are DC components. In this case, a DC bias is added to the video signal, and then, whether there is a motion vector is checked in step 340.

After step 340, if there is a motion vector, the motion of a video signal is compensated for using a post-processed video signal and a video signal produced by the adder 227 in step 350, and only the video signal, i.e., a border portion of a block, produced by the adder 227 is post-processed in step 360. The motion of the border portion of the block is compensated using a video signal that is not post-processed, and the motion of a central portion of the block is compensated for using the post-processed video signal.

When there is no motion vector, the motion of a video signal is compensated for using the post-processed signal, but the decoded video signal is not post-processed, in step 390.

When the video signal is a compressed intra frame or the sum of the AC components for the DCT coefficients is larger than the critical value, the motion of a video signal is compensated using only the video signal produced by the adder 227, in step 370. Thereafter, the decoded video signal is post-processed using the adder 227.

In conclusion, it is possible not to perform a great amount of post-processing on screen blocks that do not change with respect to the motion vector characteristics and DCT coefficient characteristics, which are smaller than a critical value and do not have motion vectors. Also, regions to be post-processed do not take up greater parts of overall video signals, and therefore, the post-processing process can be quickly completed.

While this invention has been particularly shown and described with reference to preferred embodiments thereof, it will be understood by those skilled in the art that various changes in form and details may be made therein without departing from the spirit and scope of the invention as defined by the appended claims. For instance, the present invention can be applied to all kind of digital video reproduction apparatuses with post-processing.

As described above, post-processing can be performed only on a desired region of a video signal using a motion vector and DCT coefficients of a difference image. Accordingly, completion of the post-processing is fast and computational load of a video reproduction apparatus is reduced.

What is claimed is:

1. A method of reproducing a compressed video signal, the method comprising:

(a) variable length decoding the compressed video signal to detect quantized discrete cosine transform (DCT) coefficients and a motion vector, when the compressed video signal is input as a bit stream;
(b) inversely quantizing the quantized DCT coefficients detected in (a);
(c) performing an inverse DCT (IDCT) on the DCT coefficients obtained in (a) to detect a difference video signal; and
(d) selectively performing post-processing on the decoded video signal, based on the motion vector detected in (a) and the characteristics of the difference video signal detected in (c),
wherein selectively performing post-processing on the decoded video signal comprises:
comparing the sum of the DCT coefficients of the difference video signal with a critical value;
detecting if there is a motion vector when the sum of the DCT coefficients is smaller than the critical value;
comparing the sum of AC components of the DCT coefficients with the critical value when the sum of the DCT coefficients is larger than the critical value;
detecting if there is a motion vector when the sum of the AC components of the DCT coefficients is smaller than the critical value; and
selectively post-processing the decoded video signal, depending on whether a motion vector is detected or not.

2. The method of claim 1, wherein the post-processing process is not performed and the motion of the video signal is compensated using the post-processed video signal when the size of the motion vector is 0, and the motion of the video signal is compensated for using the post-processed video signal and the decoded video signal when the size of the motion vector is not 0.

3. The method of claim 1, wherein a border portion of a block is post-processed when the size of the motion vector is not 0.

4. The method of claim 1, wherein when the sum of the AC components of the DCT components is larger than the critical value, the decoded video signal is post-processed.

5. The method of claim 1, wherein (d) comprises post-processing the decoded video signal if the compressed video signal is an intra frame.

6. A video reproduction apparatus for reproducing a video signal compressed by a DCT and variable length encoding, the apparatus comprising:
a video decoder for performing a variable length decoding process and an IDCT on a compressed video signal, which is input as a bit stream in order, to detect a motion vector and a difference video signal, and compensating for the motion of the input video signal using the motion vector; and
a post-processor for selectively post-processing the input video signal based on the motion vector and the characteristics of the difference video signal produced by the video decoder,
wherein the post-processor comprises:
a post-processing unit for post-processing the decoded video signal generated by the video decoder;
a buffer for storing the video signal processed by the post-processing unit; and
a post-processing controller for checking the post-processing of the post-processing unit using the motion vector and the characteristics of the DCT coefficients for the difference video signal detected by the video decoder, and selectively compensating the motions of the video signal stored in the buffer and a video signal output from the video decoder, and
wherein the post-processing controller compares the size of the motion vector with a critical value to detect the motion vector, and compares DCT coefficients of the difference video signal with the critical value in order to detect characteristics of the DCT coefficients.

* * * * *